United States Patent
Cordeiro

(10) Patent No.: US 10,075,958 B2
(45) Date of Patent: *Sep. 11, 2018

(54) MULTIBAND CENTRAL CONTROLLER AND METHOD FOR MULTIBAND NETWORK OPERATIONS

(71) Applicant: Intel Corporation, Santa Clara, CA (US)

(72) Inventor: Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/680,635

(22) Filed: Aug. 18, 2017

(65) Prior Publication Data

US 2018/0035431 A1 Feb. 1, 2018

Related U.S. Application Data

(63) Continuation of application No. 13/993,267, filed as application No. PCT/US2011/065122 on Dec. 15, 2011, now Pat. No. 9,743,407.

(51) Int. Cl.
*H04W 72/04* (2009.01)
*H04W 36/06* (2009.01)
*H04W 28/16* (2009.01)

(52) U.S. Cl.
CPC ....... *H04W 72/0453* (2013.01); *H04W 28/16* (2013.01); *H04W 36/06* (2013.01)

(58) Field of Classification Search
None
See application file for complete search history.

(56) References Cited

U.S. PATENT DOCUMENTS

| 9,743,407 B2 | 8/2017 | Cordeiro et al. |
| 2007/0165693 A1 | 7/2007 | Samuel Mo et al. |
| 2008/0198813 A1 | 8/2008 | Lu |
| 2009/0203405 A1 | 8/2009 | Horneman et al. |
| 2009/0298497 A1 | 12/2009 | Lee |

(Continued)

FOREIGN PATENT DOCUMENTS

WO    WO-2013105923 A2    7/2013

OTHER PUBLICATIONS

"U.S. Appl. No. 13/993,267, Corrected Notice of Allowance dated May 24, 2017", 2 pgs.

(Continued)

*Primary Examiner* — Saba Tsegaye
(74) *Attorney, Agent, or Firm* — Schwegman Lundberg & Woessner, P.A.

(57) ABSTRACT

Embodiments of a multiband central controller, a multiband communication station and methods for multiband network operations are generally described herein. In some embodiments, the central controller may be configured for multiband operations within non-coextensive frequency bands. The central controller may transmit a response frame to a receiving station that includes two or more multiband elements. Each multiband element includes a basic service set identification (BSSID) and may indicate an available channel and a frequency band associated with the available channel. The frequency band may be one of the non-coextensive frequency bands within which the central controller is operating. The multiband elements may provide frequency band and channel information to the station prior to the station joining a network that is managed by the central controller.

29 Claims, 2 Drawing Sheets

(56) References Cited

U.S. PATENT DOCUMENTS

| | | | |
|---|---|---|---|
| 2009/0323608 A1* | 12/2009 | Adachi | H04W 48/18 370/329 |
| 2010/0195586 A1 | 8/2010 | Choi et al. | |
| 2010/0332822 A1 | 12/2010 | Liu et al. | |
| 2011/0159866 A1 | 6/2011 | Kim et al. | |
| 2013/0010719 A1 | 1/2013 | Shapira | |
| 2013/0051353 A1 | 2/2013 | Kim et al. | |
| 2013/0114586 A1* | 5/2013 | Kim | H04L 5/0091 370/338 |
| 2013/0115965 A1 | 5/2013 | Xu | |
| 2013/0336248 A1 | 12/2013 | Cordeiro | |
| 2014/0010186 A1 | 1/2014 | Cordeiro | |

OTHER PUBLICATIONS

"U.S. Appl. No. 13/993,267, Final Office Action dated Oct. 21, 2016", 16 pgs.

"U.S. Appl. No. 13/993,267, Non Final Office Action dated Jul. 15, 2015", 13 pgs.

"U.S. Appl. No. 13/993,267, Notice of Allowance dated Apr. 21, 2017", 5 pgs.

"U.S. Appl. No. 13/993,267, Preliminary Amendment filed Jun. 11, 2013", 3 pgs.

"U.S. Appl. No. 13/993,267, Response filed Jun. 6, 2016 to Non Final Office Action dated Feb. 4, 2016", 10 pgs.

"U.S. Appl. No. 13/993,267, Response filed Feb. 21, 2017 to Final Office Action dated Oct. 21, 2016", 10 pgs.

"U.S. Appl. No. 13/993,267, Non Final Office Action dated Feb. 4, 2016", 12 pgs.

"U.S. Appl. No. 13/993,267, Response filed Oct. 14, 2015 to Non Final Office Action dated Jul. 15, 2015", 9 pgs.

"International Application Serial No. PCT/US2011/065122, International Search Report dated Aug. 23, 2013", 3 pgs.

"International Application Serial No. PCT/US2011/065122, Written Opinion dated Aug. 23, 2013", 6 pgs.

* cited by examiner

MULTIBAND CENTRAL CONTROLLER AND METHOD FOR MULTIBAND NETWORK OPERATIONS

PRIORITY CLAIM

This invention is a continuation application of U.S. application Ser. No. 13/993,267, filed Sep. 27, 2013, now U.S. Pat. No. 9,743,407, which claims priority to International Application No. PCT/US2011/065122, filed Dec. 15, 2011, all of which are incorporated herein by reference in their entirety

RELATED APPLICATION

This application is related to patent application entitled "METHOD, APPARATUS AND SYSTEM FOR FAST SESSION TRANSFER FOR MULTIPLE FREQUENCY BAND WIRELESS COMMUNICATION" Ser. No. 12/977,289 filed Dec. 23, 2010.

TECHNICAL FIELD

Embodiments pertain to wireless communications. Some embodiments relate to wireless local area networks (WLANs) and wireless personal area networks (PANs). Some embodiments relate to multiband communications in accordance with an IEEE 802.11 specification. Some embodiments relate to multiband communications in accordance with a wireless gigabit alliance (WiGig) specification and/or the IEEE 802.11ad specification.

BACKGROUND

WLAN and PAN devices may operate in one or more frequency bands, such as a 2.4 GHz frequency band, a 5 GHz frequency band, and a 60 GHz frequency band. In some cases, WLAN devices may also operate in a frequency band below 1 GHz. One issue with operating in these various frequency bands is the ability of the network's central controller to manage use of these different frequency bands to provide a better quality of service for users and an improved user experience.

Thus there are general needs for central controllers and methods for multiband operations that provide a better quality of service to users as well as an improved user experience.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
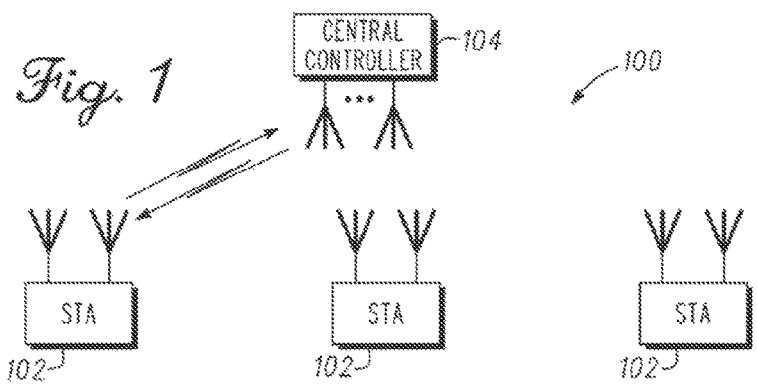
FIG. 1 illustrates a wireless network including central controller and a plurality of stations configured for multiband operation in accordance with embodiments.

FIG. 1 illustrates a wireless network including central controller and a plurality of stations configured for multiband operation in accordance with embodiments. The wireless network 100 includes central controller 104 and a plurality of stations (STA) 102. At least some stations 102 may be multiband stations. The central controller 104 is configured for multiband operations within non-coextensive frequency bands. In these embodiments, the central controller 104 may be a multiband central controller and may communicate with stations 102 on two or more frequency bands. In some embodiments, the central controller 104 may be multiband access point (AP), a multiband personal basic service set (PBSS) control point (PCP), a multiband base station (BS), or other communication station that manages network operations with the stations 102, although the scope of the embodiments is not limited in this respect. Wireless network 100 may be PAN or a WLAN that may operate in accordance with one or more wireless communication standards or techniques including the IEEE 802.11a/b/g/n/ac communication standards, a WiGig standard and/or the IEEE 802.11 ad communication standard.

In accordance with embodiments, the central controller 104 may provide multiband channel information to a station 102, including providing frequency band and channel information prior to network joining. In some embodiments, the central controller 104 may transmit a response frame to a station 102 that includes one or more multiband elements (MBEs). Each multiband element may include a basic service set identification (BSSID) and may indicate an available channel and a frequency band associated with the available channel. The frequency band may be one of a plurality of non-coextensive frequency bands within which the central controller 104 is operating. These embodiments are discussed in more detail below. In some embodiments, the central controller 104 may transmit a response frame to a station 102 that includes two or more multiband elements. These embodiments are also discussed in more detail below.

In some embodiments, each frequency band may be associated with a different BSSID, although this is not a requirement as virtualization may be used to allow the use the same BSSID within more than one frequency band. The frequency bands may be non-overlapping or non-coextensive frequency bands. In some embodiments when the response frame includes several multiband elements, each multiband element may include a BSSID and indicate an available channel and a frequency band associated with the available channel.

The inclusion of one or more multiband elements in a response frame may allow the central controller 104 to provide frequency band and channel information to a station 102 prior to network joining. The inclusion of one or more multiband elements in a response frame may also allow the central controller 104 to perform load balancing between frequency bands and to mitigate interference. The inclusion of one or more multiband elements in a response frame may also allow the central controller 104 to dedicate particular frequency bands to particular traffic types. In these ways, a better quality of service to users as well as an improved user experience may be achieved.

In some embodiments, a station 102 may be a portable wireless communication device, such as a mobile communication device or handset, personal digital assistant (PDA), a laptop or portable computer with wireless communication capability, a web tablet, a wireless telephone or smart phone, a wireless headset, a pager, an instant messaging device, a digital camera, a television, a medical device (e.g., a heart rate monitor, a blood pressure monitor, etc.), or other device that may receive and/or transmit information wirelessly. In some embodiments, a station 102 may include one or more of a keyboard, a display, a non-volatile memory port, multiple antennas, a graphics processor, an application processor, speakers, and other mobile device elements. The display may be an LCD screen including a touch screen.

Figure 2:
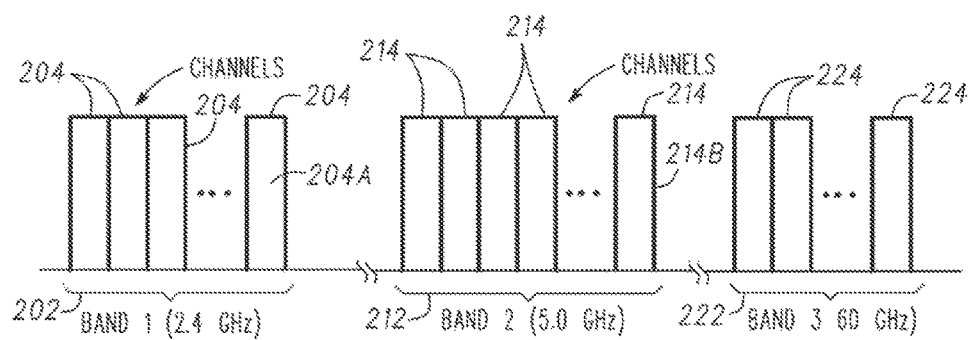
FIG. 2 illustrates channels within several non-coextensive frequency bands in accordance with some embodiments.

FIG. 2 illustrates channels within several non-coextensive frequency bands in accordance with some embodiments. FIG. 2 illustrates several non-coextensive frequency bands 202, 212, 222. Frequency band 202 may include channels 204, frequency band 212 may include channels 214 and frequency band 222 may include channels 224. In accordance with embodiments, the central controller 104 (FIG. 1) may communicate within any two or more of the frequency bands.

In some embodiments, frequency band 202 may be in the 2.4 GHz frequency range, frequency band 212 may be in the 5 GHz frequency range and frequency band 224 may be in the 60 GHz frequency range. In some embodiments, the several non-coextensive frequency bands also include frequency bands in other frequency ranges, such as a frequency band in the 800 to 1000 MHz range, although this is not a requirement.

Figure 3:
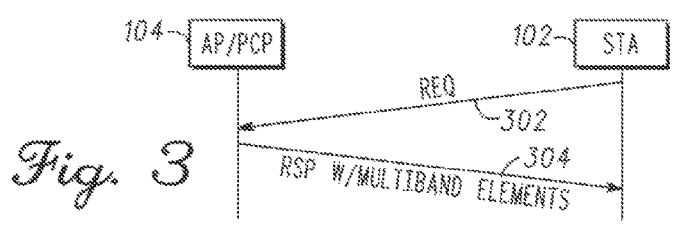
FIG. 3 illustrates the communication of response and request frames in accordance with some embodiments.

FIG. 3 illustrates the communication of response and request frames in accordance with some embodiments. Response frame (RSP) 304 may be transmitted by the central controller 104 (FIG. 1) to a station (STA) 102 in response to request frame (REQ) 302. The response frame 304 may include one or more multiband elements and each multiband element may include a basic service set identification (BSSID) and may indicate an available channel and a frequency band associated with the available channel.

In some embodiments, the central controller 104 may determine channel activity on the channels 204, 214, 224 (FIG. 2) within the frequency bands 202, 212, 222 (FIG. 2), may determine channel loading and may identify channels with available capacity. In these embodiments, since the central controller 104 may be operating on other channels of other bands (i.e., other than the frequency band and channel on which the request frame 302 is received), the central controller 104 may possess accurate information on the amount of traffic being carried on these channels.

In some embodiments, the response frame 302 may comprise a probe response frame, an association response frame, a reassociation response frame or a fast session transfer (FST) protocol setup response frame that is transmitted in response to a probe request frame, an association request frame, a reassociation request frame or a FST protocol setup request frame, respectively. In these embodiments, the use of a multiband element allows the frequency band and channel to be provided to a station 102 prior to network joining. Furthermore, the use of a multiband element may allow the central controller 104 to redirect a station that is attempting to join the network to another channel or frequency band that is not one in which the station is currently operating.

The use of the FST protocol in some embodiments may allow the transmitting station to switch a communication session from a current channel to a channel of another frequency band. In some embodiments, the FST protocol may include operating a session on a first frequency band and/or a first channel. The session may be described by state information kept or stored in the stations (e.g., central controller 104 and one of stations 102) that have an established direct physical link. The FST protocol may also include setting an agreement to operate the session on a second frequency band and/or a second channel, and establishing a direct physical link on a second frequency band and/or a second channel. The FST protocol may also include transferring the session to the second frequency band and/or the second channel.

In some embodiments, the central controller 104 may receive a request frame 302 from a station 102 on a channel 204A (FIG. 2) of the first frequency band 202 and transmit the response frame 304 back to the station 102 on the channel 204A of the first frequency band 202. At least one multiband element may be included in the response frame 304 to indicate at least an available channel (e.g., channel 214B) of a second frequency band (e.g., frequency band 212) within which the central controller 104 is operating. The second frequency band may be non-coextensive with the first frequency band 202 (i.e., they do not overlap), although this is not a requirement.

In some embodiments, for an association request frame that is received from a station 102 on channel 204A of frequency band 202, the association response frame may be transmitted back to that station 102 by the central controller 104 on that same channel (e.g., channel 204A of frequency band 202). The association response frame may indicate to the station 102 the channels of other frequency bands on which the central controller 104 is operating. Among other things, this allows the central controller 104 to select a particular frequency band for communicating with a particular station.

Figure 4:
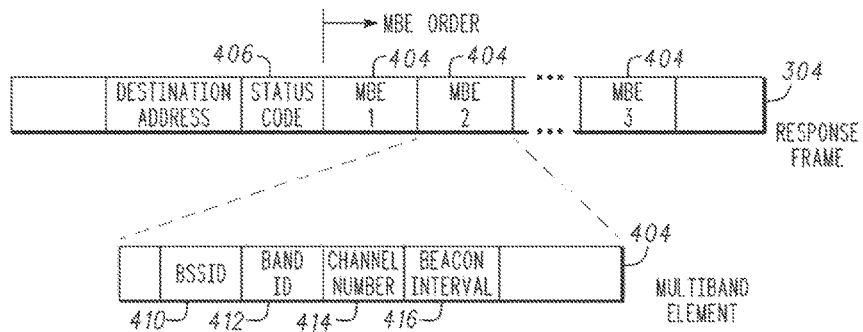
FIG. 4 illustrates some fields of a response frame including a multiband element in accordance with some embodiments.

FIG. 4 illustrates some fields of a response frame including a multiband element in accordance with some embodiments. Response frame 304 may include, among other things, a destination address field, a status code field 406 and one or more multiband elements (MBEs) 404. The destination address field may include the address of the particular receiving station that the frame 304 is intended or the destination address field may include a broadcast address. Each multiband element 404 may include a BSSID field 410 to indicate the BSSID, a channel number field 414 to indicate an available channel, a band ID field 412 to indicate the associated frequency band of the available channel, and a beacon interval field 416 to indicate a size of a beacon interval size of the channel.

The status code field 406 may include a status code that may indicate to a receiving station 102 that the order of the two or more multiband elements 404 in the response frame 304 is an order that the station 102 is to use to attempt to associate or reassociate with the central controller 104. In these embodiments, when indicated by the status code field 406, a station with multiband capability, such as station 102, may first use the channel indicated in the first multiband element 404 of the response frame 304, and if unsuccessful, then use the channel indicated by the next multiband element 404 within the response frame 304, as so forth. Stations without multiband capability, on the other hand, may ignore the multiband elements 404 in the response frame 302 and may attempt to associate or reassociate with the central controller 104 on channels within a single frequency band.

The use of an ordered list in a response frame may help reduce unnecessary scanning that may be performed by a station 102 when attempting to join the central controller's network since the central controller has indicated the order of the frequency band and channels for the station 102 to use. In this way, quicker network access is achieved as well as reduced power consumption and extended battery life.

The order of the multiband elements 404 in the response frame 304 may be selected by the central controller 104 based on traffic loading so that a station 102 may attempt to join the network on a channel of a frequency band that may have a lower traffic load. The order of the multiband elements in the response frame 304 may also be selected by the central controller 104 to mitigate interference so that a station 102 may attempt to join the network on a channel of a frequency band to reduce interference with other associated stations.

In some embodiments, when the channel number field 414 and beacon interval field 416 are both non-zero, the station 102 receiving the multiband element 404 may attempt to associate or reassociate with the central controller 104 on the channel indicated in the channel number field 414. When the central controller 104 is not currently operating (i.e., transmitting/receiving) on a particular channel, it may set the channel number field 414 and/or beacon interval field 416 to zero. When the channel number field 414 and/or beacon interval field 416 are set to zero, it may indicate that the central controller 104 is capable of operating on that channel (i.e., since the central controller 104 is a multiband central controller) but that the central controller 104 is not currently not operating on that channel.

The beacon interval field 416 may indicate the beacon interval size of the associated channel. For example, a multiband element 404 that is transmitted on channel 204A may carry information about channel 214B. The beacon interval field may allow the station 102 to determine when (i.e., the instant of time) to switch to channel 214B based on the size of the beacon interval in channel 214B and the offset of that beacon interval with respect to the beacon interval in channel 204A. In some embodiments, the central controller 104 may transmit a separate beacon in each band, however this is not a requirement.

In some embodiments, the central controller 104 may dedicate one of the frequency bands for communications of a first type and utilize another frequency band for communications of a second type. For example, the central controller 104 may dedicate one of the frequency bands for video communications and utilize another frequency band for non-video communications. The selection of the frequency band for the particular type of communications may be based on the bandwidth or data rate requirements as well as latency and other quality-of-service (QoS) level requirements for the particular type of communications. Video communications may require a higher bandwidth, a higher data rate and lower latency, so the central controller 104 may select channels in the 5 GHz band or the 60 GHz band, for example, while channels in the 2.4 GHz band may be selected for other communications. The selection of channels and frequency bands may also be based on current channel conditions. In these embodiments, the central controller 104 may indicate to a station 102 in a multiband element 404 the particular channel and frequency band to use based on the content of the communications.

In addition to providing multiband channel information to stations 102 prior to network joining, in some embodiments the central controller 104 may load balance and switch stations between frequency bands and channels based on the traffic load. The central controller 104 may send an action or request frame in accordance with the FST protocol. The frame may include a multiband element 404 that indicates to a station 102 to switch a current communication session from a current channel to a channel in another frequency band. In this way, loading can be reduced for any particular frequency band and channel providing improved service to all associated stations. In some embodiments, the frame may include two or more multiband element 404 which may be ordered for use by a station 102 as discussed herein.

In some embodiments, the central controller 104 may perform interference mitigation by switching stations and streams to channels of different frequency bands based on interference experienced. In these embodiments, the central controller 104 may send an action or request frame in accordance with the FST protocol that includes a multiband element that indicates to a station 102 to switch to a current communication session from a current channel experiencing interference to a channel in another frequency band that is not experiencing interference. In these embodiments, the central controller may implement an FST protocol to switch a current communication session with a station 102 between channels of different bands.

Figure 5:
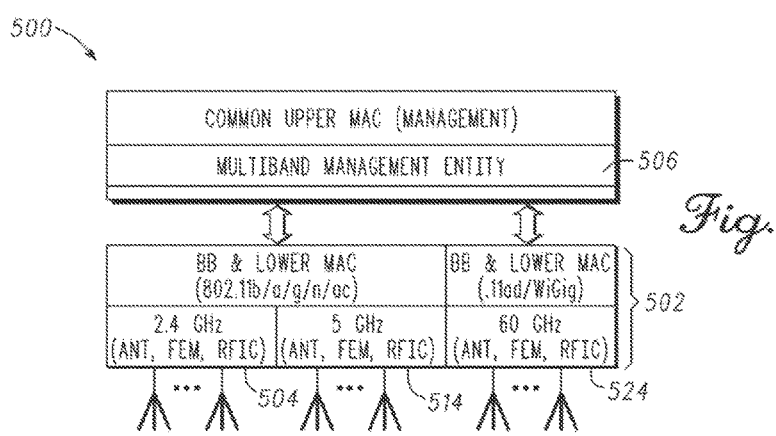
FIG. 5 illustrates a multiband communication device in accordance with some embodiments.

FIG. 5 illustrates a portion of a multiband communication device in accordance with some embodiments. Multiband communication device portion 500 may be suitable for use as part of a multiband central controller, such as central controller 104 (FIG. 1) although other configurations may also be suitable. Multiband communication device portion 500 may be suitable for use as part of a multiband communication station, such as one or more of stations 102 (FIG. 1), although other configurations may also be suitable.

Multiband communication device portion 500 may include a multiband transceiver 502 which may include physical-layer (PHY) circuitry such as transceiver portions 504, 514, and 524 for communicating in various frequency bands. Multiband communication device portion 500 may also include a multiband management entity 506 to manage the multiband operations of the multiband communication device portion 500. Multiband communication device portion 500 may also include a common upper medium access control (MAC) to manage access to the wireless medium in each of the frequency bands. In the example illustrated, baseband circuitry and a single lower MAC may be provided for the 2.4 GHz and the 5 GHz frequency bands and may be configured for communication in accordance with one of the IEEE 802.11a/b/g/n/ac communication standards, although this is not a requirement. Baseband circuitry and another lower MAC may be provided for the 60 GHz frequency band and may be configured for communication in accordance with the WiGig or the IEEE 802.11ad communication standards. Each transceiver portion 504, 514, and 524 may utilize one or more antenna for communicating. In multiple-input multiple-output (MIMO) embodiments, each MIMO-configured transceiver portion 504, 514, and/or 524 may utilize two or more antennas for communicating.

When operating as part of a central controller 104, the multiband management entity 506 may identify available channels and configure the one or more multiband elements 404 (FIG. 4) of a response frame 304 (FIG. 4) to, among other things, indicate the available channels and the frequency band associated with the available channels.

In some embodiments, the multiband transceiver 502 includes at least two transceivers including two or more of a 2.4 GHz band transceiver portion 504, a 5 GHz band transceiver portion 514 and a 60 GHz band transceiver portion 524. In some embodiments, the multiband transceiver 502 includes all three transceivers including the 2.4 GHz band transceiver portion 504, the 5 GHz band transceiver portion 514 and the 60 GHz band transceiver portion 524. In some embodiments, the multiband transceiver 502 may also include an 800-1000 MHz transceiver portion (not separately illustrated). In some embodiments, the 60 GHz band transceiver portion 524 may utilize separate antennas than the 2.4 GHz band transceiver portion 504 and the 5 GHz band transceiver portion 514. In some embodiments, each transceiver portion may utilize its own antennas and the antennas may be configured for the particular frequency band, although this is not a requirement as the transceiver portions may share antennas.

The antennas may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some MIMO embodiments, antennas may be effectively separated to take advantage of spatial diversity and the different channel characteristics that may result between each of antennas and the antennas of a transmitting station. In some MIMO embodiments, antennas for a particular frequency band may be separated by up to $1/10$ of a wavelength or more.

Although the multiband communication device portion 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the multiband communication device portion 500 may refer to one or more processes operating on one or more processing elements.

Referring back to FIG. 1, at least some of the stations 102 as well as the central controller 104 may have multiband capability. In accordance with an example embodiment, a multiband station may first scan channels on the 2.4 GHz band since that is a widely deployed band. If the channel on the 2.4 GHz band is overloaded and a conventional central controller receives a either an association request frame or a reassociation request frame from the station 102 on that channel, the conventional central controller may accept the request and risk degrading the service on that channel even more or may reject the request. If the conventional central controller rejects the request, the burden is on the station 102 to continue scanning others channels. In other words, the station 102 receives no indication from a conventional central controller of where it should try next. This leads to a longer latency to association, higher power consumption at the station 102 and consequently, poorer user experience.

Embodiments disclosed herein may improve the user experience, may reduce device power consumption and may reduce joining latency. In these embodiments, the use of a multiband element 404 may provide a pre-association mechanism that enables a multiband capable central controller, such as central controller 104, to recommend a list of bands and channels to a station 102 that is not yet associated with the central controller 104. Upon receiving such list of bands and channels in multiband elements 404, the station 102 may directly try to join the network on those specific channels, thus eliminating the need for the station 102 to hopelessly scan multiple channels and risk having association and reassociation requests denied.

As discussed above, in some embodiments the central controller 104 may include more than one multiband element 404 in probe response, an association response or a reassociation response frame to recommend a list of bands and channels for use by the receiving station 102. Embodiments disclosed herein also provide rules to govern the ordering in which multiband element are included in the frames. Embodiments also provide rules to govern how a station 102 uses the information in a multiband element 404 to improve the efficiency of the scanning and network joining time when a station 102 receives a probe response, an association response or a reassociation response frame that includes more than one multiband element 404.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, multiband communication device portion 500 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. Apparatus for a client station (STA) configurable for multi-band operation, the apparatus comprising:

baseband circuitry to decode an association or reassociation response frame received from an access point, the response frame including a plurality of multiband elements ordered in an order that includes a first multiband element and a sequential second multiband element that the STA is to use to attempt to associate or reassociate with the access point;

wherein each of the multiband elements includes a basic service set identification (BSSID) field, a channel number field to indicate an available channel, and a band ID field to indicate one of a plurality of frequency bands associated with the available channel; and wherein the baseband circuitry is to cause the STA to conduct communications with the access point according to a fast session transfer (FST) protocol, wherein the communications according to the FST protocol are initiated in response to communication of the first multiband element or the sequential second multiband element by the access point to the STA.

2. The apparatus of claim 1, wherein the association or reassociation response frame is a FST response frame.

3. The apparatus of claim 1, wherein baseband circuitry is to cause the STA to attempt to associate or reassociate with the access point on the channel indicated in the channel number field when the channel number field and a beacon interval field of the multiband element are both nonzero.

4. The apparatus of claim 1, wherein each of the multiband elements is to indicate said one of the frequency bands by a band ID value representing one of a plurality of non-coextensive frequency bands within which the STA is configured to operate.

5. The apparatus of claim 1, wherein the baseband circuitry is to implement a multiband management entity to manage multiband operations of the STA.

6. The apparatus of claim 1, wherein the baseband circuitry is to decode the association or reassociation response frame as one of: a probe response frame, an association response frame, a reassociation response frame or a fast session transfer (FST) protocol setup response frame.

7. The apparatus of claim 1, further comprising:
transceiver circuitry operatively coupled to the baseband circuitry, the transceiver circuitry to be operatively coupled to at least one antenna element.

8. The apparatus of claim 1, wherein the band ID field is to indicate one of the plurality of frequency bands from among a 2.4 GHz frequency band, a 5 GHZ frequency band, and a 60 GHz frequency band.

9. At least one non-transitory machine-readable medium comprising instructions that, when executed by a processor of a client station (STA) configurable for multi-band operation, cause the STA to:
decode an association or reassociation response frame received from an access point, the response frame including a plurality of multiband elements ordered in an order that includes a first multiband element and a sequential second multiband element that the STA is to use to attempt to associate or reassociate with the access point;
wherein each of the multiband elements includes a basic service set identification (BSSID) field, a channel number field to indicate an available channel, and a band ID field to indicate one of a plurality of frequency bands associated with the available channel; and
conduct communications with the access point according to a fast session transfer (FST) protocol, wherein the communications according to the FST protocol are initiated in response to communication of the first multiband element or the sequential second multiband element by the access point to the STA.

10. The at least one non-transitory machine-readable medium of claim 9 wherein the association or reassociation response frame is a FST response frame.

11. The at least one non-transitory machine-readable medium of claim 9, wherein the instructions are to further is to cause the STA to attempt to associate or reassociate with the access point on the channel indicated in the channel number field when the channel number field and a beacon interval field of the multiband element are both nonzero.

12. The at least one non-transitory machine-readable medium of claim 11, wherein each of the multiband elements is to indicate said one of the frequency bands by a band ID value representing one of a plurality of non-coextensive frequency bands within which the STA is configured to operate.

13. The at least one non-transitory machine-readable medium of claim 11, wherein the instructions are to further cause the STA to decode the association or reassociation response frame as one of: a probe response frame, an association response frame, a reassociation response frame or a fast session transfer (FST) protocol setup response frame.

14. The at least one non-transitory machine-readable medium of claim 11, wherein the band ID field is to indicate one of the plurality of frequency bands from among a 2.4 GHz frequency band, a 5 GHZ frequency band, and a 60 GHz frequency band.

15. A method for fast session transfer (FST) by a client station (STA) configurable for multi-band operation, the method comprising:
decoding, by the STA, an association or reassociation response frame received from an access point, the response frame including a plurality of multiband elements ordered in an order that includes a first multiband element and a sequential second multiband element that the STA is to use to attempt to associate or reassociate with the access point;
wherein each of the multiband elements includes a basic service set identification (BSSID) field, a channel number field to indicate an available channel, and a band ID field to indicate one of a plurality of frequency bands associated with the available channel; and
conducting communications, by the STA, with the access point according to a fast session transfer (FST) protocol, wherein the communications according to the FST protocol are initiated in response to communication of the first multiband element or the sequential second multiband element by the access point to the STA.

16. The method of claim 15, wherein the association or reassociation response frame is a FST response frame.

17. The method of claim 15, further comprising:
attempting to associate or reassociate, by the STA, with the access point on the channel indicated in the channel number field when the channel number field and a beacon interval field of the multiband element are both nonzero.

18. The method of claim 15, wherein each of the elements is to indicate said one of the frequency bands by a band ID value representing one of a plurality of non-coextensive frequency bands within which the STA is configured to operate.

19. The method of claim 15, wherein the STA implements a multiband management entity to manage multiband operations of the STA.

20. The method of claim 15, further comprising:
decoding, by the STA, the association or reassociation response frame as one of:
a probe response frame, an association response frame, a reassociation response frame or a fast session transfer (FST) protocol setup response frame.

21. The method of claim 15, wherein the band ID field is to indicate one of the plurality of frequency bands from among a 2.4 GHz frequency band, a 5 GHZ frequency band, and a 60 GHz frequency band.

22. Apparatus for a client station (STA) configurable for multi-band operation, the apparatus comprising:
means for decoding an association or reassociation response frame received from an access point, the response frame including a plurality of multiband elements ordered in an order that includes a first multiband element and a sequential second multiband element that the STA is to use to attempt to associate or reassociate with the access point;
wherein each of the multiband elements includes a basic service set identification (BSSID) field, a channel number field to indicate an available channel, and a band ID field to indicate one of a plurality of frequency bands associated with the available channel; and means for causing the STA to conduct communications with the access point according to a fast session transfer (FST) protocol, wherein the communications according to the FST protocol are initiated in response to communication of the first multiband element or the sequential second multiband element by the access point to the STA.

23. The apparatus of claim 22, wherein the association or reassociation response frame is a FST response frame.

24. The apparatus of claim 22, further comprising:
means for causing the STA to attempt to associate or reassociate with the access point on the channel indicated in the channel number field when the channel number field and a beacon interval field of the multiband element are both nonzero.

25. The apparatus of claim 22, wherein each of the multiband element is to indicate said one of the frequency bands by a band ID value representing one of a plurality of non-coextensive frequency bands within which the STA is configured to operate.

26. The apparatus of claim 22, further comprising:
means for managing multiband operations of the STA.

27. The apparatus of claim 22, further comprising:
means for decoding the association or reassociation response frame as one of: a probe response frame, an association response frame, a reassociation response frame or a fast session transfer (FST) protocol setup response frame.

28. The apparatus of claim 22, further comprising:
transceiver circuitry operatively coupled to the means for causing the STA to conduct communications, the transceiver circuitry to be operatively coupled to at least one antenna element.

29. The apparatus of claim 22, wherein the band ID field is to indicate one of the plurality of frequency bands from among a 2.4 GHz frequency band, a 5 GHZ frequency band, and a 60 GHz frequency band.

* * * * *

UNITED STATES PATENT AND TRADEMARK OFFICE
CERTIFICATE OF CORRECTION

PATENT NO. : 10,075,958 B2
APPLICATION NO. : 15/680635
DATED : September 11, 2018
INVENTOR(S) : Carlos Cordeiro It is certified that error appears in the above-identified patent and that said Letters Patent is hereby corrected as shown below:

In the Claims

In Column 9, Lines 48-49, in Claim 11, after "further", delete "is to"

Signed and Sealed this
Twenty-first Day of April, 2020

Andrei Iancu
*Director of the United States Patent and Trademark Office*